United States Patent [19]

Nakayama et al.

[11] Patent Number: 5,338,646
[45] Date of Patent: Aug. 16, 1994

[54] OPTICAL MEMORY DEVICE HAVING AN IMPROVED LIGHT REFLECTION OR OPTICAL MEMORY LAYER

[75] Inventors: Junichiro Nakayama, Shiki; Tomoyuki Miyake, Nara; Hiroyuki Katayama, Nara; Kazuo Van, Nara; Kenji Ohta, Kitakatsuragi, all of Japan

[73] Assignee: Sharp Kabushiki Kaisha, Osaka, Japan

[21] Appl. No.: 15,066

[22] Filed: Feb. 8, 1993

Related U.S. Application Data

[63] Continuation of Ser. No. 540,096, Jun. 19, 1990, abandoned.

[30] Foreign Application Priority Data

Jun. 22, 1989 [JP] Japan ................... 1-160407

[51] Int. Cl.$^5$ .................. G03C 1/72; G11B 5/702; G11B 5/706
[52] U.S. Cl. .................. 430/270; 430/495; 430/945; 346/135.1; 428/694; 428/900
[58] Field of Search ............ 430/270, 495, 945; 428/694, 900; 346/135.1

[56] References Cited

U.S. PATENT DOCUMENTS

| | | | |
|---|---|---|---|
| 3,718,474 | 2/1973 | Kolb et al. | 430/270 |
| 4,335,183 | 6/1982 | Hosuka et al. | 420/330 |
| 4,378,303 | 5/1982 | Ronn et al. | 430/495 |
| 4,614,951 | 9/1986 | Osato et al. | 346/135 |
| 4,814,256 | 3/1989 | Aldag et al. | 430/270 |
| 4,837,063 | 6/1989 | Irie | 428/64 |
| 4,857,438 | 8/1989 | Loerzer et al. | 430/332 |
| 4,893,581 | 1/1990 | Matsuda et al. | 430/745 |
| 5,084,370 | 1/1992 | Bell et al. | 430/270 |

FOREIGN PATENT DOCUMENTS

| | | |
|---|---|---|
| 0068330 | 1/1983 | European Pat. Off. . |
| 0158906 | 10/1985 | European Pat. Off. . |
| 0166924 | 1/1986 | European Pat. Off. . |
| 2841179 | 4/1979 | Fed. Rep. of Germany . |
| 3238285 | 4/1984 | Fed. Rep. of Germany . |
| 59-045642 | 3/1984 | Japan . |
| 0201243 | 11/1984 | Japan . |
| 63-183638 | 12/1988 | Japan . |
| 63-317943 | 12/1988 | Japan . |
| 64-008092 | 1/1989 | Japan . |
| 64-087684 | 3/1989 | Japan . |
| 2127611 | 9/1983 | United Kingdom . |

OTHER PUBLICATIONS

Nikkei Electronics, Aug. 17, 1981, pp. 187–206.
Nikkei Electronics, Mar. 28, 1983, pp. 105–120.
Optoelectronics, 1986, pp. 1–18.
Woodward et al "Image–Forming Systems Based On Photopolymerization" Photographic Science and Engineering, vol. 7, No. 6, pp. 360–368, Nov.–Dec. 1963.
Carasso et al., Phillips Tech. Rev., 40(6), 1982, pp. 151–155.

Primary Examiner—Lee C. Wright
Attorney, Agent, or Firm—David G. Conlin; George W. Neuner

[57] ABSTRACT

An optical memory device comprising at least one transparent substrate and a light reflection layer or an optical memory layer laminated on one surface of the substrate, in which the light reflection layer or the optical memory layer is constituted with a UV-ray or electron-ray cured resin dispersingly containing a light reflective metal powder or an optical recording material.

15 Claims, 3 Drawing Sheets

OPTICAL MEMORY DEVICE HAVING AN IMPROVED LIGHT REFLECTION OR OPTICAL MEMORY LAYER

This is a continuation of copending application Ser. No. 07/540,096 filed on Jun. 19, 1990, now abandoned.

BACKGROUND OF THE INVENTION

1. Field of the Invention

The present invention concerns an optical memory device conducting at least one of optical information recording, reading and erasing.

2. Description of the Related Art

An optical memory device such as a compact disk can conduct at least one of optical information recording, reading and erasing. Basically, as shown in FIGS. 3 to 6, there are a single-face type optical memory device 19, 23 comprising a transparent substrate 20 and a light reflection layer 21 or comprising a transparent substrate 24 and a recording layer (optical memory layer 25), as well as a both-face optical memory device 27, 35 comprising two transparent substrates 28 and 32, a reflection layer 29, 31 put between them or comprising two transparent substrates 36, 40 and a recording layer 37, 39 put between them. Each of the reflection layers 21, 29, 31 is composed of a metal film by vapor deposition or sputtering having high reflectivity to a semiconductor laser light, while the recording layer 25, 37, 39 is constituted with a film prepared by vapor deposition, CVD, sputtering or coating of optical recording material such as an magneto-optical recording medium or an organic photosensitive material.

The single-face type optical memory devices 19, 23 have a coating layer 22 and coating layer 26 made, for example, of a UV-cured resin being overlaid on the reflection layer 21 and the recording layer The both-face type optical memory devices 27, 35 have adhesive layers 30, 38 made, for example, of UV-ray cured resin and the two optical disks 33 and 34 and the two optical disks 41 and 42 being bonded together by means of the adhesive layers 30, 38 respectively.

As has been described above, in the single-face type optical memory devices 19, 23 constituted by disposing the coating layers 22, 26 on each one surface of the substrates 20, 24, the coating layers 22, 26 serve to protect the reflection layer 21 and the recording layer 25. Further, in the optical memory device 27, 35 constituted by stacking the two optical disks 33 and 34, and the two optical disks 41, 42, information can be recorded on both surfaces and rear face thereby having a merit of increasing the recording capacity by twice and a merit of protecting the reflection layers 29, 31 and the recording layers 37, 39 (refer, for example to NIKKEI ELECTRONICS p187–206. Vol. 8.17 (1981); ibid, p 105–120, Vol. 3. 28 (1983); OPTOELECTRONICS TECHNOLOGY 1986 "Optical Disk System, Published from Optical Industry and Technology Association (1986, 2, By the way, in the conventional structures as described above, for example, in the manufacturing step for the optical memory device 19, it is necessary to form the reflection layer 21 on the transparent substrate 20 and, thereafter, to form the coating layer 22 further. Further, in the manufacturing step for the optical memory 35, for example, it is necessary to form the recording layer 37, 19 to the transparent substrate 36, 40 respectively and, thereafter, to form the adhesive layer 38 further. With these reasons, they involve a problem of reducing the productivity, which leads to increased cost.

SUMMARY OF THE INVENTION

In accordance with the present invention, there is provided an optical memory device comprising at least one transparent substrate and a light reflection layer or an optical memory layer laminated on one surface of the substrate, in which the light reflection layer or the optical memory layer comprises a UV-ray or electron-ray cured resin dispersingly containing a light reflecting metal powder or optical recording material.

DETAILED DESCRIPTION OF THE PREFERRED EMBODIMENT

Figure 1:
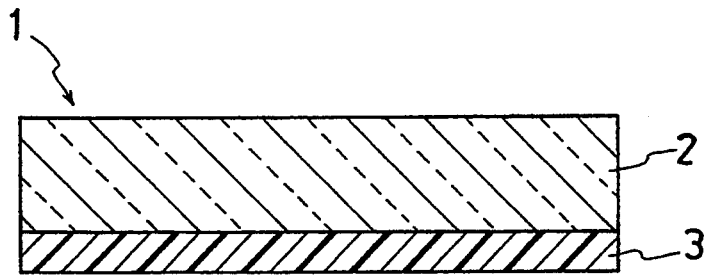
FIG. 1 and FIG. 2($a$), ($b$) are, respectively, explanatory views illustrating a constitution of one embodiment of the optical memory device according to the present invention.

The present invention has been accomplished based on the finding that a film of UV-ray or electron-ray cured resin dispersingly containing a light reflective metal powder or an optical recording materials functions as a light reflection layer or an optical memory layer like that the conventional optical memory device.

The light reflection layer or the optical memory layer comprising such a cured resin can constitute a single-face or both-face type optical memory device with no particular requirement for a coating layer or an adhesive layer as in the conventional device.

Accordingly, the manufacturing steps can be simplified remarkably as compared with usual cases.

As the transparent substrate in the present invention, there can be mentioned a light transmitting resin plate such as made of polycarbonate or acrylic reins or a glass plate. In the case of using the substrate as that for the light reflection layer, those applied with desired information recording means such as pits on the light reflection layer-forming surface are used and such transparent substrate can be manufactured by a known method using a stamper, etc. Further, in the case of using the substrate as that for the optical memory layer, those applied with guide tracks or guide pits for helping the scanning of light beam are used.

As the light reflective metal powder constituting the light reflection layer in the present invention, a powder of metal with excellent reflecting performance to light and, in particular, to a semiconductor laser light is suitable and, for example, a powder of Al, Au, Ag, Cu, Ni and/or Pt is preferably used. A powder having a grain size of from 0.1 to 100 μm is suitable.

On the other hand, as the optical recording material, constituting the optical memory layer in the present invention, various materials and compounds capable of physically or chemically changing their optical characteristics, magnetic characteristics, etc., under the irradiation of light can be used and those preferred are magneto-optical recording material and organic or inorganic optical recording material.

As the magneto-optical recording material, a powder of garnet or like magnetic materials is suitable and examples thereof are powder of ferrites such as of Fe-Al-O or Fe-Ga-O, in particular, a BiDyFeA10 or BiYFe- GaO ferrite is preferred. A powder having a grains size of form 0.1 to 100 μm is suitable.

As the organic optical recording material, organic dyes or photochromic compounds are suitable and specific examples thereof are shown in examples described later. Further, as the inorganic optical recording material, various compounds which are known as photosensitive agents can be used and there can be mentioned, for example, a silver halide.

The UV-ray or electron-ray cured resin as a matrix for the light reflective metal powder or the optical recording material means those resins cured by the irradiation of UV-ray or electron-rays. Such resins are prepared from UV-ray or electron-ray curable resins. AS specific examples of the curable resins, there can be mentioned polyurethane acrylate, polyester acrylate and epoxy acrylate type UV-ray or electron-ray curable resins known in the art of lithography.

The light reflection layer in the present invention can be prepared by mixing the light reflective metal powder and the curable resin (or a solution thereof in an organic solvent), coating the mixture on the transparent substrate, applying an appropriate drying treatment, applying a curing treatment and, further, applying a heat treatment as required. In this case, the amount of the metal powder mixed is suitably from 5 to 75 vol % and, more preferably, from 10 to 60 vol % in the final cured resin.

The optical memory layer in the present invention can also be formed on the transparent substrate by mixing the optical recording material and the curable resin (or a solution thereof in an organic solvent) and then coating them on a transparent substrate in the same way as described above. The amount of mixing is suitably from 5 to 75 vol % and, more preferably, from 10 to 60 vol % as described above.

In the case of constituting a both-face type memory device, the light reflection layer or the optical memory layer is formed by disposing the mixed resin as described above between a pair of recording transparent substrates before the curing treatment and then irradiating UV-rays or electron-rays on the side for at least one of the substrates to cure the resin. In any of the types, the thickness of the light reflection layer or the optical memory layer is suitably from 0.1 to 100 μm and more preferably, from 1 to 10 μm.

EXAMPLE

Example 1

The present invention will be explained by way of its preferred embodiment referring to FIG. 1.

A memory device 1 according to the present invention has a structure as shown in FIG. 1, in which a coating layer 3 is disposed on one surface of a transparent substrate 2. The transparent substrate 2 is made of polycarbonate or PMMA (of 1.2 mm thickness), to which information (pits) have already been transferred by a stamper, etc. in the substrate molding process. The coating layer 3 comprises an acrylic UV-curable resin mixed with a reflective metal of Al or Au (powder: 0.1 to 100 μm grain size), which is formed to the transparent substrate 2 on the side in which the information have been transferred.

For the constitution as described above, the method of manufacturing the optical memory device 1 will be explained next.

At first, the UV-curable resin mixed with the reflective metal is disposed to the transparent substrate 2 on the side in which the information have already been transferred. Then, the curable resin is cured by the irradiation of UV-rays to form a coating layer 3 thereby obtaining the optical memory device 1.

Thus, the coating layer 3 protects the transparent substrate 2 and also serves as a reflection layer. Accordingly, when light applied to the transparent substrate 2 on the side opposite to the coating layer 3, the light is reflected by the coating layer 3 that also serves as the reflection layer and information can be read. In this example, similar signal to noise ratio (S/N) to those of the conventional optical disks are obtained, with the thickness of the coating layer of 10 μm and the content of the metal powder of 50 vol % and using a mixture of an urethane acrylate and an acrylic ester monomer for the acrylate type UV-curable resin.

Example 2

Another example of the present invention will be explained referring to FIGS. 2(a) and 2(b).

Figure 2A:
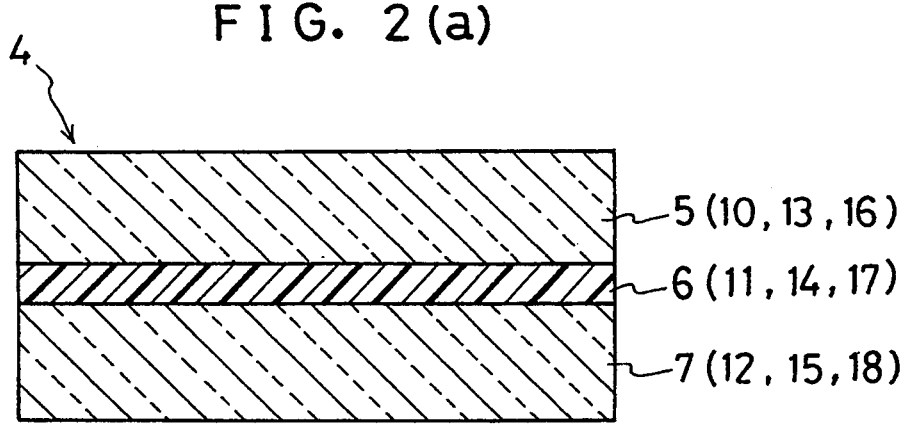

An optical memory device 4 according to the present invention has a structure as shown in FIG. 2(a) in which two transparent substrates 5 and 7 are appended by means of an adhesive layer 6 made of a UV-curable resin and disposed between the transparent substrates 5 and 7.

Each of the transparent substrates 5 and 7 is made of a glass (1.2 mm thickness) and the adhesive layer 6 is formed with an acrylate type UV-curable resin (5 μm thickness) mixed with an optical recording material consisting of a silver halide emulsion (50 vol %), for example, DREXON (trade mark)(Japanese Patent Laid Open Sho 55-108995 or J. Vac Sci. Technol., Vol. 18, No. 1, 1981, p 87–91) etc. The structure basically comprises the transparent substrates 5 and 7 integrated with the recording layer placed on each of the surfaces thereof.

For the constitution as described above, the method of manufacturing the optical memory device 4 will be explained below.

The two transparent substrates 5 and 7 are overlaid by way of UV-curable resin mixed with the recording material as the adhesive layer 6 to constitute a state, in which the adhesive layer 6 is disposed between the transparent substrates 5 and 7. In this state, UV-rays are applied to cure the adhesive layer 6 thereby append the transparent substrates 5 and 7 to each other. Then, the transparent substrates 5 and 7 appended by way of the adhesive layer 6 is applied with a heat treatment in an atmospheric air at 250° C., to obtain the optical memory device 4. Thus, the adhesive layer 6 appends the transparent substrates 5 and 7 to each other and it serves as a recording layer (optical memory layer).

Figure 2B:
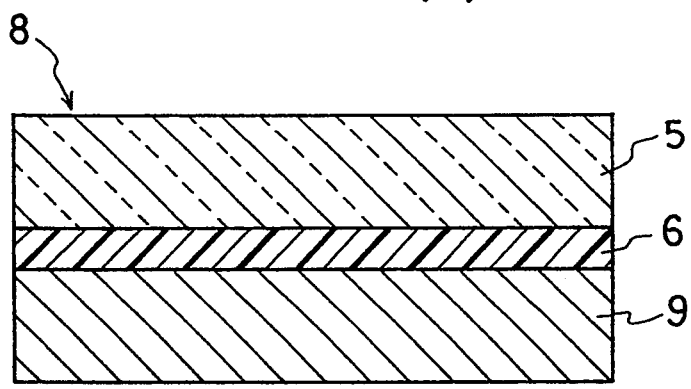
Figure 3:
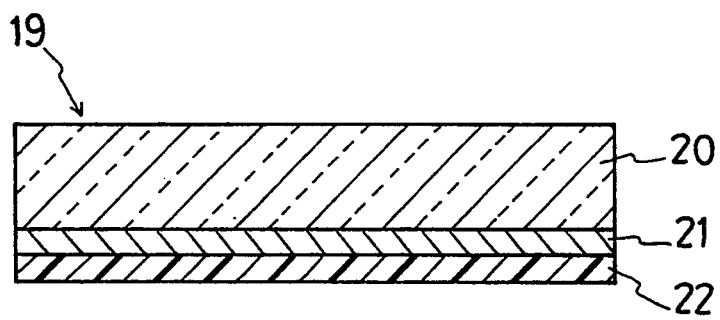
FIGS. 3 through 6 are, respectively, explanatory views illustrating conventional optical memory device.
Figure 4:
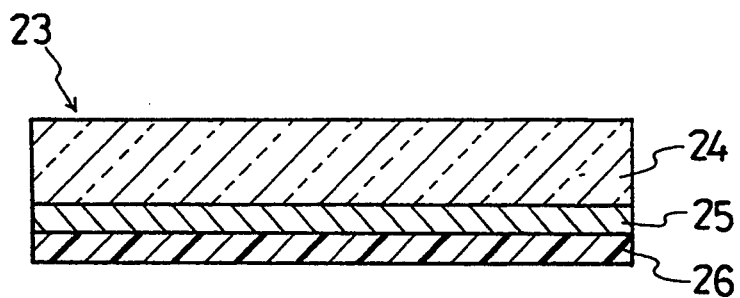
Figure 5:
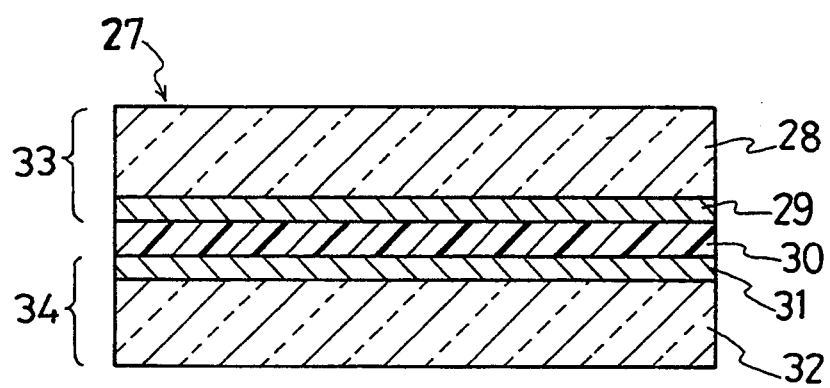
Figure 6:
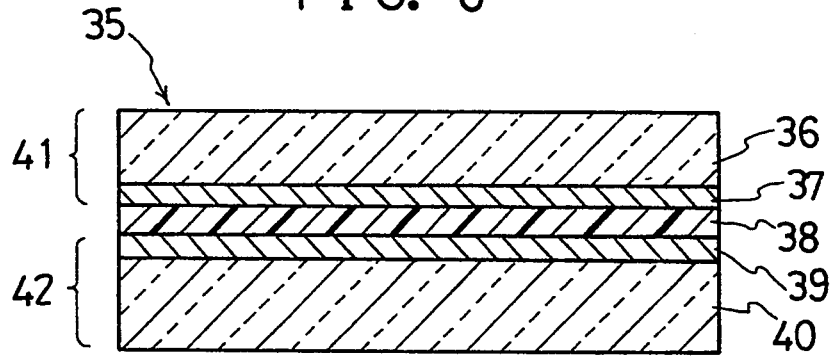

The optical memory device 4 is not restricted only to the both-face type of the structure as described above in which a plurality of transparent substrates 5 and 7 are appended by means of the adhesive layer 6, but it may be constituted, for example, as shown in FIG. 2(b) such that a metal substrate 9 for protecting the adhesive layer 6 also serving as the recording layer is appended to one surface of the transparent substrate 5 by means of the adhesive layer 6. The substrate 9 may be replaced with a thermostable plastic plate. Also it may be single-face type having no substrate 9.

Example 3

A further example of the present invention will be explained referring to FIG. 2(a). For the convenience of the explanation, FIG. 2(a) used for example 2 is referred to again also in this explanation.

The optical memory device according to the present invention has a structure in which two transparent substrates 10 and 12 are appended to each other by means of an adhesive layer 11 made from a UV-curable resin disposed between the substrates 10 and 12. Each of the transparent substrates 10 and 12 is made of glass and the adhesive layer 11 is made of an acrylate type UV-curable resin 1 μm thickness) mixed with a recording material, a cyanine dye (20 vol %) represented by the following chemical formula:

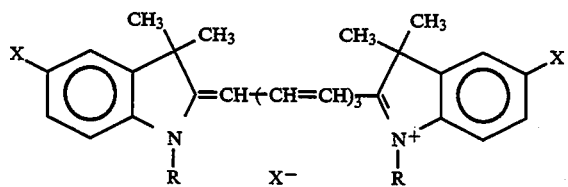

where R represents a lower alkyl group and X represents a halogen atom.

For the constitution described above, when the optical memory device is manufactured, the two transparent substrates 10 and 12 are at first overlaid with each other by means of a photocurable resin mixed with the recording material as the adhesive layer 11 into a state in which the adhesive layer 11 is put between the transparent substrates 10 and 12. In this state, UV-rays are applied to cure the adhesive layer 11, by which the transparent substrates 10 and 12 are appended to each other to obtain an optical memory device. Then, the adhesive layer 11 appends the transparent substrates 10 and 12 to each other and also serves as a recording layer.

The recording layer is not restricted to the cyanine dye described above and, for example, organic dyes such as squalium, naphthoquinone, phthalocyanine or anthraquinone series dyes may be used.

Example 4

A further example of the present invention will be explained referring to FIG. 2(a). For the convenience of the explanation, FIG. 2(a) used for Example 2 is referred to again also in this explanation.

The optical memory device according to the present invention has a structure in which two transparent substrates 13 and 15 are appended to each other by means of an adhesive layer 14 made of a UV-curable resin disposed between the substrates 13 and 15. Each of the transparent substrates 13 and 15 is made of glass and the adhesive layer 14 is made, for example, of an acrylate type UV-curable resin mixed with magneto-optical recording material (0.1 to 100 μm of grain size; 50 vol %) i.e., garnet represented by the chemical formula: $Bi_x Dy_{3-x} Fe_{5-y} Al_y O_{12}$ (Kawanishi, et. al. Summary of Academic Lectures of Applied Magnetics Society, 1985, p 313) or $Bi_x Y_{3-x} Fe_{5-y} Ga_y O_{12}$ (Abe, et. al. summary of Academic Lectures of Applied Magnetics Society 1985 p 314).

For the constitution described above, when the optical memory device is manufactured, the two transparent substrates 13 and 15 are at first overlaid with each other by means of a photocurable resin mixed with the recording material as the adhesive layer 14, into a state in which the adhesive layer 14 is put between the transparent substrates 13 and 15. In this state, UV-rays are applied to cure the adhesive layer 14, by which the transparent substrates 13 and 15 are appended to each other to obtain an optical memory device. Thus, it has been confirmed that the adhesive layer 14 appends the transparent substrates 13 and 15 and also serves as an opto-magnetic recording layer.

The recording material as described above is not restricted only to the garnet of the above-mentioned composition and any specific composition may be used so long as the material is garnet or like ferrite.

Example 5

The optical memory device according to the present invention has a structure in which two transparent substrates 16 and 18 are appended to each other by means of an adhesive layer 17 made from a UV-curable resin disposed between the substrates 16 and 18. Each of the transparent substrates 16 and 18 is made of glass and the adhesive layer 17 is made, for example, of an acrylate type curable resin mixed with 20 vol % of a photochromic material comprising a stilbene derivative generally represented by the following chemical formula as the organic optical recording material:

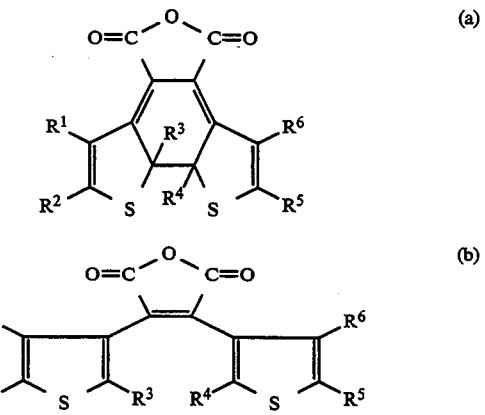

where $R^1$–$R^6$ each represents a lower alkyl group.

The compounds (a) and (b) are isomers to each other and they are in the form of (a) to exhibit blue-purple color upon irradiation of light at a wave length: $\lambda_1 = 405$ nm. Further, they are in the form of (b) which is colorless under the irradiation of light at a wave length $\lambda_2 = 633$ nm.

For the constitution described above, when the optical memory device is manufactured, the two transparent substrates 16 and 18 are at first overlaid with each other by means of a photocurable resin mixed with the recording material as the adhesive layer 17. into a state in which the adhesive layer 17 is put between the transparent substrates 16 and 18. In this state, UV-rays are applied to cure the adhesive layer 17, by which the transparent substrates 16 and 18 are appended to each other to obtain an optical memory device. Then, the adhesive layer 17 appends the transparent substrates 16 and 18 to each other and also serves as a recording layer.

The photochromic material is not restricted to the stilbene derivative described above but any of the compounds forming isomers of different absorption wavelength due to the difference of wavelength of irradiated light may be used with no restriction for specific types, for example, flugide, spiropyrane, triarylmethane, azobenzene, thioinidgo, salicylidene aniline, dihydroxy anthraquinone and dithizone mercury.

Similar optical memory device can also be constituted by using an electron ray-curable resin instead of the UV-curable resin used in the previous examples.

As has been described above, the optical memory device according to the present invention can be manufactured without disposing separate coating layers 22, 26 or adhesive layers 30, 38 necessary so far. Accordingly, it can provide an advantageous effect of simplifying the manufacturing step and contributing to the mass production and reduction of the cost.

What we claimed is:

1. An optical memory device consisting of a transparent platic substrate having guide tracks and an optical memory layer laminated on one surface of the substrate, in which the optical memory layer consist essentially of a UV-ray or electron ray cured resin of a mixture containing the resin and an optical recording material and is formed on the substrate without the use of a solvent.

2. The device of claim 1 which the optical recording material is a magneto-optical recording material or an organic or inorganic optical recording material whose optical characteristics may be chemically changed.

3. The device of claim 2 in which the magneto-optical recording material is a ferrite powder.

4. The device of claim 2 in which the organic optical recording material is an organic dye selected from cyanine, squalium, naphthoquinone, phthalocyanine or anthraquinone series.

5. The device of claim 2 in which the organic optical recording material is a photochromic compound selected from stilbene, fulgide, spiropyrane, triarylmethane, azobenzene, thioindigo, salicylidene aniline, dihydroxy anthraquinone and dithizone mercury series.

6. The device of claim 2 in which the inorganic optical recording material is a silver halide.

7. The device of claim 1 in which the UV-ray cured resin is made of a polyurethane acrylate, polyester acrylate or epoxy acrylate type.

8. The device of claim 1 which is in the form of a single-face type.

9. The device of claim 1 which is in the form of both-face type.

10. The device of claim 1 in which the depth of the light reflection or optical memory layer is between about 0.1 $\mu$m. and about 100 $\mu$m.

11. The device of claim 1 in which the depth of the light reflection or optical memory layer is between about 1 $\mu$m. and about 10 $\mu$m.

12. An optical memory device consisting of a transparent substrate and a light reflection layer laminated on one surface of the substrate, in which the light reflection layer consists essentially of a UV-ray or electron ray cured resin of a mixture containing the resin and a light reflective metal powder.

13. The device of claim 12 in which the light reflective metal powder is made of Al, Au, Ag, Cu, Ni or Pt.

14. The device of claim 12 in which the light reflective metal powder has a gran size of from 0.1 to 100 $\mu$m.

15. The device of claim 12 in which the content of the light reflective metal powder is from 5 to 75 vol % in the light reflection layer.

* * * * *